C. NATVIG.
FLOWER POT.
APPLICATION FILED APR. 11, 1916.
1,214,356.
Patented Jan. 30, 1917.
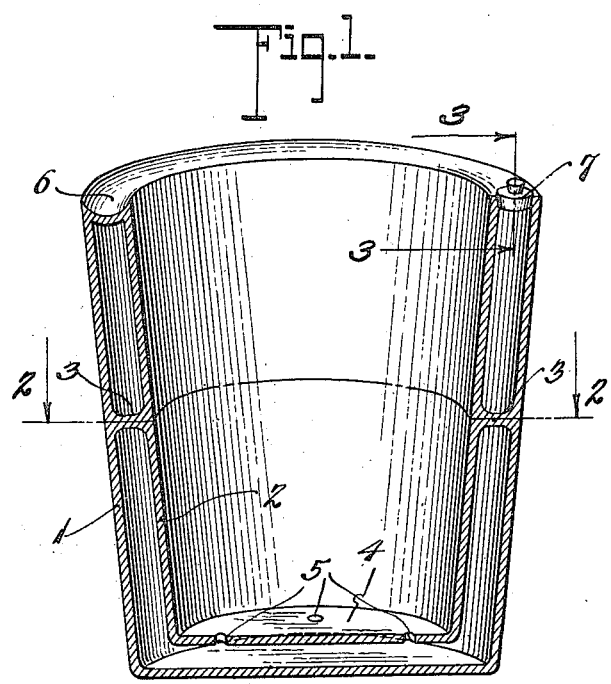
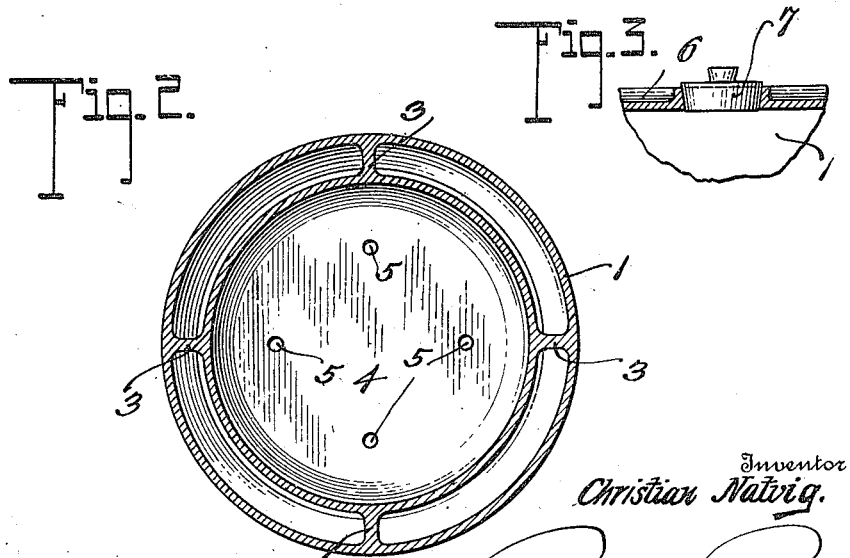
Witness
C.H. Wagner
Inventor
Christian Natvig.
By Robt H Cobb
Attorneys.

UNITED STATES PATENT OFFICE.

CHRISTIAN NATVIG, OF IVANHOE, MINNESOTA.

FLOWER-POT.

1,214,356.

Specification of Letters Patent.

Patented Jan. 30, 1917.

Application filed April 11, 1916. Serial No. 90,402.

*To all whom it may concern:*

Be it known that I, CHRISTIAN NATVIG, a citizen of the United States, residing at Ivanhoe, in the county of Lincoln and State of Minnesota, have invented certain new and useful Improvements in Flower-Pots, of which the following is a specification.

The present invention is designed as a simple article of manufacture in the form of a vessel or receptacle particularly useful as a flower-pot.

The primary object of my device is to provide for maintaining a suitable supply of moisture for the contents of the receptacle, in order to accomplish which, it is formed with a double wall, the space between said walls constituting a reservoir for water.

While I am well aware that double walled flower-pots have been proposed heretofore, they have been more or less complicated in construction, whereas my object is to produce a simple article that may be cheaply manufactured and this is a desideratum of consequence in receptacles of this character.

For a full understanding of the present invention, reference is to be had to the following description and the accompanying drawing, in which:

Figure 1 is a vertical sectional view of an apparatus constructed in accordance with my invention. Fig. 2 is a horizontal sectional view taken on the plane indicated by the line 2—2 of Fig. 1. Fig. 3 is a fragmentary sectional view on the line 3—3 of Fig. 1.

Throughout the following detail description, and on the several figures of the drawing, similar parts are referred to by like reference characters.

Referring particularly to Fig. 1 of the drawing, it will be observed that the receptacle which forms the subject-matter of this invention is given a conventional form in respect to its configuration, suitable for holding earth material for flowers or the like. The receptacle consists of the outer wall 1 and the inner wall 2 concentric with the outer wall and spaced therefrom a suitable distance for the purpose of holding a supply of water. At an intermediate point the walls are held in spaced relation by the webs 3. The bottom 4 of the inner container thus formed is provided with suitable openings 5 through which the liquid from the space between the walls may feed to maintain the earth contained by the receptacle in moist condition for a considerable period of time. The material about the mouth of the receptacle is depressed as indicated at 6 to form an annular channel, and in this channel is provided an opening through which the water is introduced into the space between the receptacle walls. The opening aforesaid is provided with a closure member 7.

It is obvious from the foregoing description that the formation of the vessel with the channel around the mouth thereof prevents likelihood of the liquid running over in pouring the same into the receptacle and it also facilitates the passage of the liquid into the inner space through the opening arranged therein.

The receptacle above described may be made of any suitable material, and it will be understood that the shape of the same may readily be modified as desired.

Having thus described my invention, what I claim as new is:

A receptacle of the class described comprising spaced outer and inner integral walls, supporting webs intermediate said walls, the inner of said walls at the base having feed apertures to permit passage of moisture to the contents of the receptacle, the material about the mouth of the receptacle being depressed to form a channel and having an opening in said channel communicating with the space between the walls, and closure means for said opening.

In testimony whereof I affix my signature.

CHRISTIAN NATVIG.

Copies of this patent may be obtained for five cents each, by addressing the "Commissioner of Patents, Washington, D. C."